United States Patent

Häkkinen

Patent Number: 5,839,056
Date of Patent: Nov. 17, 1998

[54] METHOD AND APPARATUS FOR CONTROLLING TRANSMISSION POWER OF A RADIO TRANSMITTER

[75] Inventor: Hannu Häkkinen, Espoo, Finland

[73] Assignee: Nokia Telecommunications Oy, Espoo, Finland

[21] Appl. No.: 705,662

[22] Filed: Aug. 30, 1996

[30] Foreign Application Priority Data

Aug. 31, 1995 [WO] WIPO ........................ PCT/FI95/00463

[51] Int. Cl.⁶ .................................................. H04B 7/005
[52] U.S. Cl. ................................ 455/69; 455/88; 455/522
[58] Field of Search ........................... 455/69, 522, 67.1, 455/67.3, 88, 127, 423, 13.4; 375/200, 206; 370/320, 335, 342

[56] References Cited

U.S. PATENT DOCUMENTS

| | | | |
|---|---|---|---|
| 4,777,653 | 10/1988 | Bonnerot et al. | 455/69 |
| 5,241,690 | 8/1993 | Larsson et al. | 455/69 |
| 5,245,629 | 9/1993 | Hall. | |
| 5,333,175 | 7/1994 | Ariyavisitakul et al. | 455/69 |
| 5,590,409 | 12/1996 | Sawahashi et al. | 455/69 |

FOREIGN PATENT DOCUMENTS

| | | |
|---|---|---|
| 656 716 | 6/1995 | European Pat. Off. . |
| 668 664 | 8/1995 | European Pat. Off. . |
| 680 159 | 11/1995 | European Pat. Off. . |
| 94/27380 | 11/1994 | WIPO ..................................... 455/69 |

Primary Examiner—Nguyen Vo
Assistant Examiner—Lester G Kincaid
Attorney, Agent, or Firm—Pillsbury Madison and Sutro LLP

[57] ABSTRACT

A method for controlling transmission power of a radio transmitter in a cellular communications system, such as in a CDMA-system, which includes determining a reference value ($SIR_m$) indicating the quality of the signals received from the radiotransmitter, determining a reference value ($P_m$, $SIR_{pm}$) indicating the current traffic load in the radiocell, and commanding the radio transmitter to adjust transmission power. In order to improve speed and reliability during any traffic conditions the method includes comparing both the reference value ($SIR_m$) for the quality of the received signals, and the reference value ($P_m$, $SIR_{pm}$) for the traffic load with predetermined target values ($SIR_t$, $P_t$, $SIR_{pt}$), and practicing the commanding of the radio transmitter to adjust its transmission power depending on the result of the comparison.

9 Claims, 3 Drawing Sheets

METHOD AND APPARATUS FOR CONTROLLING TRANSMISSION POWER OF A RADIO TRANSMITTER

FIELD OF THE INVENTION

This invention relates to a method for controlling transmission power of a radiotransmitter in a cellular communications system, the method comprising: determining a reference value indicating the quality of the signals received from the radiotransmitter, determining a reference value indicating the current traffic load in the radiocell, commanding the radiotransmitter to adjust transmission power and comparing both the reference value for the quality of the received signals, and the reference value for the traffic load with predetermined reference values, whereby the radio transmitter is commanded to adjust the transmission power depending on the result of said comparison. The invention relates also to a base station of a cellular radiosystem comprising means for communicating with mobile radiostations by using radiofrequency signals, the base station comprising: measurement means for measuring a reference value for the quality of signals received from a mobile station and means for determining a reference value for the traffic load in the radiocell; control means for commanding the mobile station to increase or to decrease the transmission power by transmitting a message to the mobile station. The invention further relates to a mobile station of a cellular radiosystem comprising means for communicating with a base station by using radiofrequency signals, the mobile station comprising: measurement means for measuring a reference value for the quality of signals received from the base station and means for determining a reference value for the traffic load in the radiocell.

BACKGROUND ART

This invention relates especially to spread spectrum communication systems, though it is possible to utilize the invention also in other types of communication systems.

The transmission power used by the mobile stations is one of the most critical factors in a spread spectrum communication system where a plurality of mobile stations simultaneously communicate over the same frequency band, such as in a CDMA (Code Division Multiple Access) system. The objective of the mobile station transmitter power control process in a CDMA system is to produce a nominal received signal power (powerlevel) from each mobile station transmitter operating within the cell. The signals of each mobile station should in other words be received at the same powerlevel at the base station regardless of the mobile stations position or propagation loss.

The power control process has a significant influence on the capacity of a CDMA system. The system capacity is maximized if the transmission power of each mobile station is controlled so that signals transmitted by it arrive at the cell site with the minimum required signal-to-interference ratio. If the signals of a mobile station arrive at the cell site with too low a value of received power, the bit error rate is too high to permit high quality communications. If the received power is too high, the performance of this mobile station is acceptable, but interference to all the other mobile station transmitters that are sharing the channel is increased, and may result in unacceptable performance to other users.

Previously is known a reverse link closed loop power control where the site takes an active role in the power control. The goal is to provide rapid corrections from the base station to the mobile station in order to maintain optimum transmission power. The base station measures the received powerlevel of each of the associated mobile station signals and compares it to target value. A determination is made every 1.25 ms to either transmit a power-up command or a power-down command to the mobile station.

One significant disadvantage with the aforementioned known solution is that the target value for the power level has to be set relatively high in order to make sure that the signals from a single mobile station can be correctly received in a situation where the traffic load is high, in other words when many mobile stations are simultaneously transmitting on the same frequency band, and the level of interference is thus high. Thus, the target value is higher than necessary in situations when the traffic load is low. This means that the transmission power used by a mobile station is higher than actually necessary when the traffic load is low, and that the mobile station is wasting energy and thus unloading its battery at a faster rate than necessary.

Another significant disadvantage with the aforementioned solution is that a power control which is based on the received powerlevel as compared to a target value does not take into account the variations in the actual disturbances from outside sources. Disturbances from outside sources means in this context disturbances from other sources than mobile stations.

Previously is also known a reverse link closed loop power control system based on the signal interference ratio (SIR) of the received signals. In this known system the base station compares the measured signal interference ratio to a predetermined threshold value and commands a mobile station either to increase or decrease its transmission power depending on the outcome of the comparison.

The greatest disadvantage with this known solution is that the power control is unstable, especially when the traffic load is high. It is very difficult for a base station to adjust the signal interference ratio target value if the traffic load varies rapidly. Such variations are typically caused by discontinuous transmission (DTX), changes in the transmission rate, and when establishing or breaking connections.

SUMMARY OF THE INVENTION

The object of the present invention is to solve the above mentioned problems and to provide a method for controlling the transmission power of a radio transmitter which method is more reliable and faster than known methods during any traffic conditions. These objects are achieved with a method which is characterized in that the comparison of the reference value for the quality of the received signals, and the reference value for the traffic load with predetermined target values comprises the steps of: calculating a first comparison value based on the relationship between the quality reference value and a target value for the quality reference value; calculating a second comparison value based on the relationship between the reference value for the traffic load and a target value for the traffic load reference value; combining the first and second comparison value to obtain a weighted comparison value which depends more of the first comparison value than of the second comparison value; and comparing the weighted value with a predetermined reference value to determine if the transmission power of the radiotransmitter should be increased or decreased.

The basic idea of the invention is that a much better outcome will be achieved for the system as a whole when both the quality of the received signals and the current traffic load in the radiocell are taken into account in controlling the transmission power of the radiotransmitter. The relationship between the measured power level and a target value for the power level is preferably combined with the relationship between measured signal interference ratio and a target value for the signal interference ratio in order to achieve a comparison value where the later relationship is weighted. This makes it possible to achieve an optimized control algorithm. To consider the received powerlevel in the adjustment of the transmission power makes the adjustment algorithm more stable. The signal interference ratio should however be weighted in the adjustment of the transmission power as the considering of the powerlevel theoretically weakens the signal interference value, in other words the quality of the connection. The method of the present invention can advantageously be utilized in a CDMA-system in both the uplink and downlink direction, in other words both for controlling the transmission power of a base station and for controlling the transmission power of a mobile station.

The reference value indicating the quality of the signals received from the radiotransmitter can be based, for instance, on the measured signal interference ratio, the bit error rate or the frame error rate. The reference value for the traffic load can correspondingly, for instance, be based on the powerlevel of received signals or on the number of ongoing calls in the radio cell.

The target values used for different mobile stations using the same services are preferably the same, which ensures that the quality of the connection is the same for users who are using similar services. The invention makes it possible for the operator to determine different target values for different kinds of services, which makes it possible to ensure a good quality for those specific connections where it is needed.

The reverse link closed loop power control method according to the present invention reacts very rapidly to changes in the signal interference ratio of a individual mobile station. But if the total load of the system increases and the interference level thus increases, all mobile stations react by increasing the transmission power only as much as is actually required, and thus by staying further away from the signal interference ratio target value than in previously known solutions.

The most significant advantages of the invention are that the transmission power of the radiotransmitters can in each situation be kept at the minimum level required which means that the energy required for transmission by each radiotransmitter is minimized, that the transmission power used by a radiotransmitter can be adjusted a lot faster than in previous solutions, and that the power control can be separately accomplished for each ongoing connection without any signalling required between the different connections.

An other object of the invention is to provide a base station by which the method of the present invention can be utilized. This is achieved by a base station which is characterized in that the control means are adapted to compare both the quality reference value and the traffic load reference value with predetermined target values and to command the mobile station to increase or to decrease transmission power as a response to said comparison.

Still another object of the invention is to provide a mobile station by which the method of the present invention can be utilized. This is achieved by a mobile station which is characterized in that the mobile station comprises control means for comparing both the quality reference value and the traffic load reference value with predetermined target values and to command the base station to increase or to decrease transmission power as a response to the comparison by transmitting a message to the base station.

BRIEF DESCRIPTION OF THE DRAWINGS

In the following, the invention will be described in greater detail by means of an advantageous embodiment of a base station and of a mobile station according to the present invention and with reference to the attached drawings, in which.

DETAILED DESCRIPTION OF THE PREFERRED EMBODIMENTS

Figure 1:
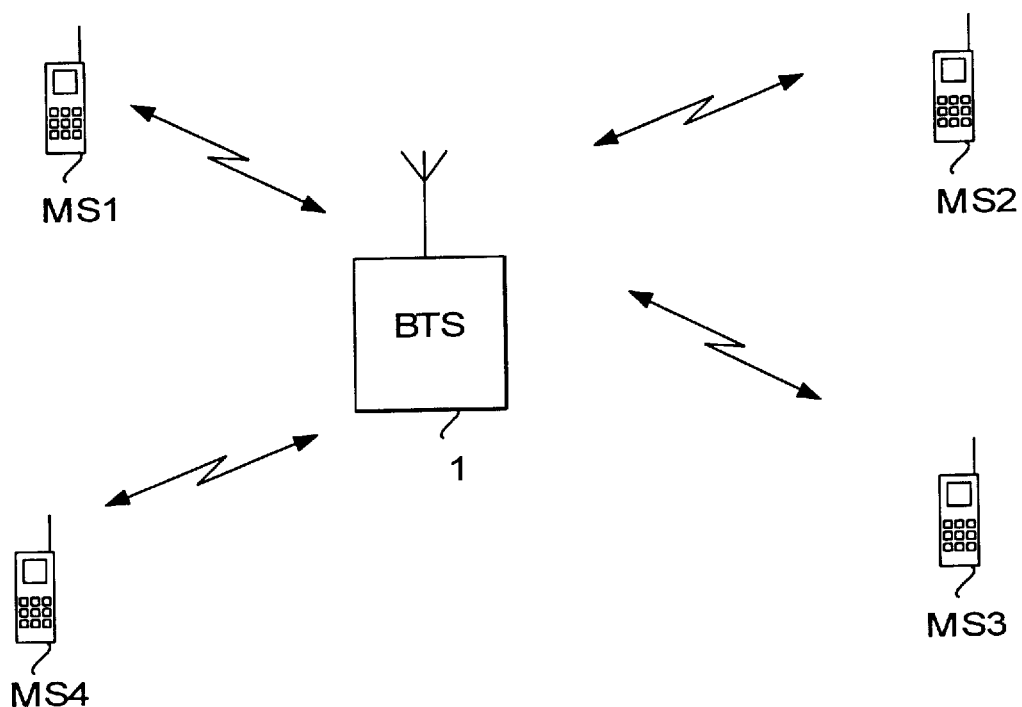
FIG. 1 illustrates a cellular communication network where the present invention can be utilized.

FIG. 1 illustrates a cellular communication network where the present invention can be utilized. The cellular communication network shown in FIG. 1 is a part of a CDMA system. Each radiocell of the cellular communications network in FIG. 1 comprises at least one base station 1, which communicates with mobile stations MS1–MS4 located within the radio coverage area of the cell. The mobile stations MS1–MS4 each communicate with the base station 1 on the same frequency band. The base station 1 is able to identify the signals transmitted by a specific mobile station MS1–MS4 from the signals transmitted by the other mobile stations MS1–MS4 by means of the chip code used by the mobile station.

The base station 1 of FIG. 1 might also use an other (or several others) frequency band in order to communicate with an other group (or several other groups) of mobile stations. In this case the signals of two groups using a different frequency band do not disturb each other. The possibility that the base station uses another frequency band does therefore not have any affect on the invention, as the function of the mobile stations of the different groups can be considered independent from each other as regarding the invention.

The fact that several mobile stations are simultaneously transmitting on the same frequency band means that the mobile stations are disturbing each other. In order to minimize these mutual disturbances, the base station 1 commands the mobile stations MS1–MS4 communicating on the same frequency band to adjust their transmission power such that the powerlevel of signals received from the different mobile stations MS1–MS4 is the same regardless of a mobile stations location within the cell or regardless of differences in propagation loss.

Figure 2:
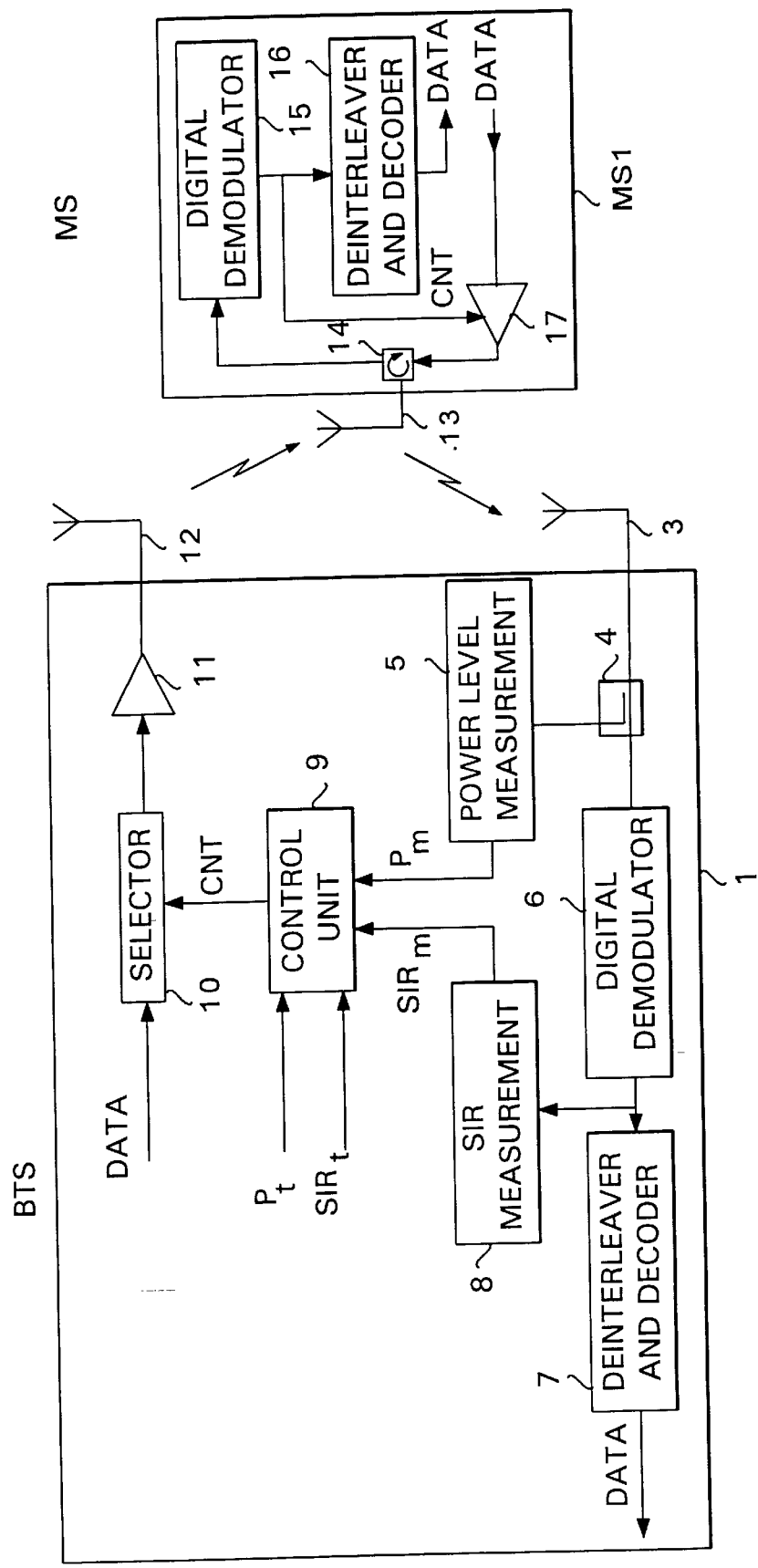
FIG. 2 illustrates the transmission power control process of a single mobile station.

FIG. 2 illustrates the transmission power control process of a single mobile station. Only those parts of the base station 1 and the mobile station MS1 which are related to the transmission power control of mobile station MS1 are shown in FIG. 2. The transmission power control process is separate and individual for each connection (ongoing call) of the base station.

The base station 1 monitors continuously the signals received from the mobile station MS1 with its reception antenna 3. For this purpose, the base station 1 comprises sampling means 4 and a powerlevel measuring unit 5, which are adapted to measure the powerlevel of the signals received from the mobile station MS1.

The signals received with antenna 3 are demodulated with a demodulator 6, and the demodulated signals are fed to a deinterleaver/decoder unit 7 and to a SIR measurement unit 8. The deinterleaver/decoder unit 7 is adapted to forward received telecommunication signals further in the network.

The SIR measurement unit 8 continuously measures the Signal Interference Ratio (SIR) for signals received from mobile station MS1. The SIR ratio indicates the ratio between signals transmitted by the mobile station MS1 as compared to signals disturbing the communication between the mobile station MS1 and the base station 1.

The base station 1 further comprises a control unit 9, which is responsive to the measured Signal Interference Ratio $SIR_m$ outputted by the SIR measurement unit 8, to the measured Powerlevel $P_m$ outputted by the powerlevel measuring unit 5, to a target Signal Interference Ratio value $SIR_t$ determined by the operator and to a target powerlevel value $P_t$ determined by the operator. The target values ($SIR_t$ and $P_t$), which preferably are the same for each connection (ongoing call) provided by the base station and using the same frequency band, can be adjustable. It is also possible for the operator to define different target values for different kinds of connections, which makes it possible to ensure the same quality for all those mobile stations which are utilizing the same kind of services.

The control unit 9 is adapted to compare the measured values with the target values by utilizing a predetermined mathematical formula and to make a decision every 1.25 ms to either transmit a power-up command or a power-down command to the mobile station MS1. The predetermined formula used can be as follows:

$$CV=(SIR_m/SIR_t)*(P_m/P_t)^n,$$

wherein $SIR_m$ is the measured signal interference ratio, $SIR_t$ is a target value for the signal interference ratio, $P_m$ is the measured powerlevel, $P_t$ is a target value for the powerlevel, and n is a weight factor.

The SIR and P values used in the formula should be given in an absolute form and not in a dB-form. The weight factor n is preferably selected so that the relation between the measured signal interference ratio and the target value for the signal interference ratio is urged more than the relation between the measured powerlevel and the target value for the powerlevel. This will, according to the invention ensure a stable and fast transmission power adjustment. A suitable value for the weight factor n can be, for instance, n=0.25.

If the calculated comparison value CV<1, the control unit 9 commands the mobile station MS1 to increase its transmission power (power-up). If on the other hand the comparison value CV>1, then the control unit 9 commands the mobile station MS1 to decrease its transmission power (power-down).

A message CNT, by which the power-up or power-down command is transmitted to the mobile station MS1, is fed from the control unit 9 to a selector 10, which is adapted to insert the CNT message in a suitable signalling frame in order to forward the CNT message to the mobile station MS1. The selector unit 10 has a second input used for receiving telecommunication signals from other parts of the network in order to forward them via a transmitter unit 11 and an antenna 12 to the mobile station MS1.

The base station 1 in FIG. 2 is shown provided with two separate antennas 3 and 12 only in order to illustrate one advantageous embodiment. It is naturally also possible to use a base station with only one single antenna, which is used both for transmission and reception.

The mobile station MS1 in FIG. 2 comprises a combined reception and transmission antenna 13 which is connected to a circulator unit 14 used for separating the RF-signals which are to be transmitted with the antenna from those which have been received with the antenna. The received signals are fed to digital demodulator 15.

The demodulated telecommunication signals are fed from the demodulator 15 to a deinterleaver/decoder unit 16, whereas the CNT message produced by the control unit 9 of the base station 1 is fed to a transmitting unit 17 in the mobile station. The transmitting unit 17 is adapted to, at predetermined steps, adjust the transmission power used by the mobile station MS1 as a response to the command included in the CNT message, in other word power-up or power-down.

Figure 3:
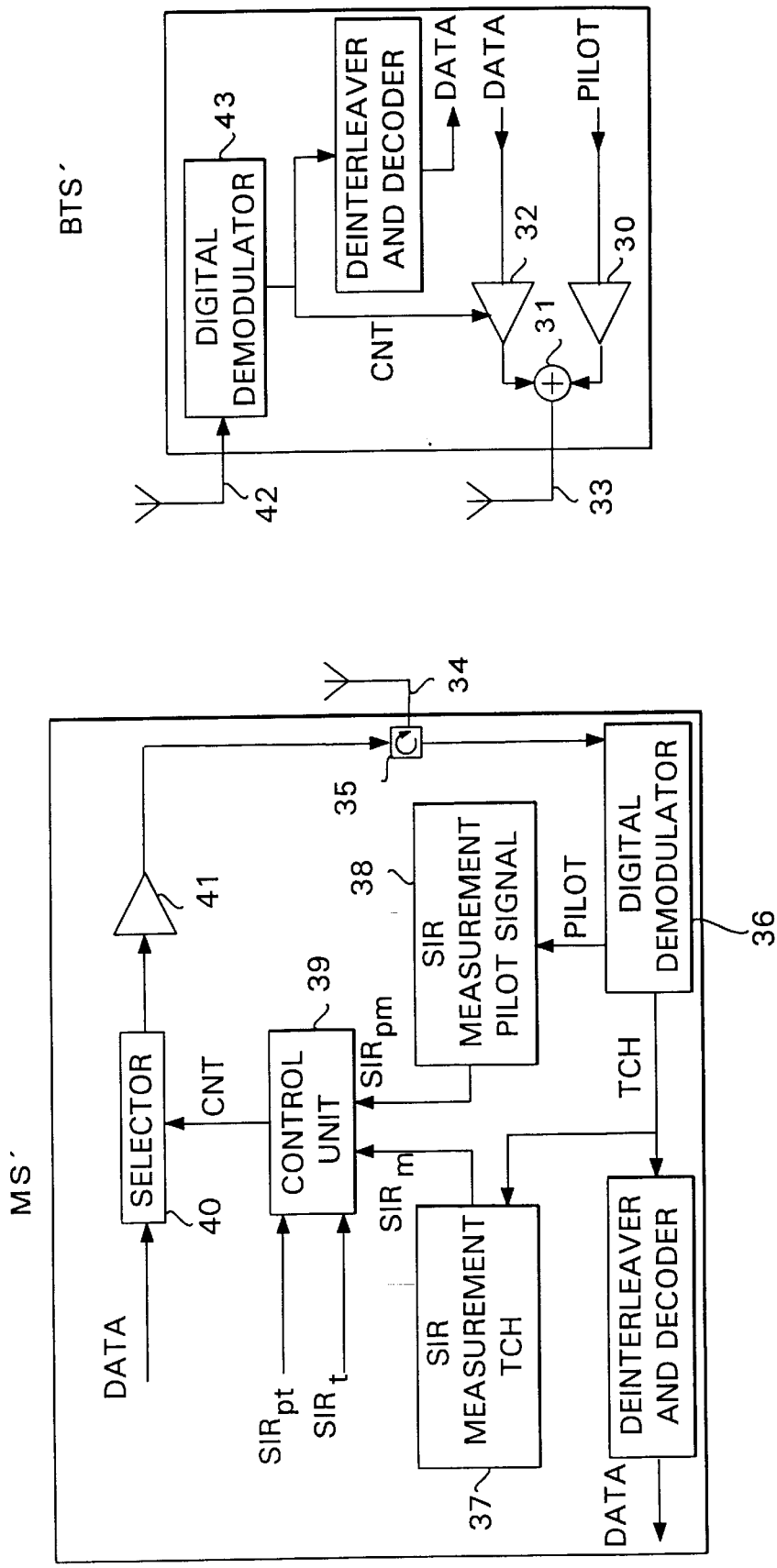
FIG. 3 illustrates the transmission power control process of a base station.

FIG. 3 illustrates the transmission power control process of a base station BTS'. The base station and the mobile station of FIG. 3 can be a part of a CDMA-system. Only those parts of the base station BTS1' and the mobile station MS' which are related to the transmission power control of the traffic channel used by base station BTS' for transmitting signals to mobile station MS1' are shown in FIG. 3. The transmission power control process is separate and individual for each connection (channel) of the base station.

Base station BTS' comprises means 30 for transmitting a pilot signal commonly used in CDMA-systems. The same pilot signal is received and utilized by all mobile stations currently communicating with base station BTS'. The pilot signal is a non-modulated signal which is transmitted with a constant transmission power and by utilizing a separate chip code. The pilot signal is utilized by the mobile stations both as a phase-reference during coherent reception and during measurements carried out in relation to handover situations.

The pilot signal is fed to a combiner device 31, which also receives a signal from a transmitter 32 which is adapted to transmit data on one of the traffic channels. The output of the combiner 31 is attached to the transmitting antenna 33 of the base station BTS'.

The mobile station MS' comprises an antenna 34 which is used both for reception and transmission. Signals received by antenna 34 are forwarded by a circulator 35 to a digital demodulator 36.

The digital demodulator 36 is adapted to separate the pilot signal PILOT (which is common to all mobile stations currently communicating with base station BTS') from the traffic channel TCH which is individual for the mobile station MS' of FIG. 3.

The mobile station MS' comprises a measurement unit 37 adapted to measure the quality of the received signals by measuring the signal interference ratio $SIR_m$ on the traffic channel. The quality of the received signals is in the case of FIG. 3 determined by comparing the Signal Interference Ratio $SIR_m$ to a target value for the Signal Interference Ratio $SIR_t$.

The mobile station MS' further comprises a measurement unit 38 adapted to measure the signal interference ratio $SIR_{pm}$ for the pilot signal. In the case of FIG. 3, the current traffic load in the radio cell is determined by comparing the signal interference ratio $SIR_{pm}$ for the pilot signal to a target value $SIR_{pt}$ for the signal interference ratio for the pilot signal.

Thus the control unit 39 of the mobile station MS' is adapted to calculate a comparison value for the transmission power of base station BTS' by utilizing the following formula:

$$CV=(SIR_m/SIR_t)*(SIR_{pt}/SIR_{pm})^n,$$

wherein $SIR_m$ is the measured signal interference ratio on the traffic channel, $SIR_t$ is a target value for the signal interference ratio on the traffic channel, $SIR_{pm}$ is the measured signal interference ratio for the pilot signal, $SIR_{pt}$ is a target value for the signal interference ratio for the pilot signal, and n is a weight factor (preferably n<1)

The control unit 39 thus continuously monitors the received signals and determines if the base station BTS' should increase or decrease its transmission power on the traffic channel utilized by mobile station MS'. If CV<1, the mobile station commands the base station to increase power, and, if CV>1, then the mobile station commands the base station to decrease the transmission power on the traffic channel in question.

The control unit 39 is adapted to command the base station to increase or to decrease transmission power by transmitting a message CNT to the base station BTS'. The message is fed by the control unit 39 to a selector 40 which forwards it via a transmitter 41 to the circulator 35 and the antenna 34 of the mobile station.

The message CNT is received by the reception antenna 42 of the base station BTS and forwarded by a digital demodulator 43 to the transmitter of the traffic channel in question, whereby the transmission power of the transmitter 32 is adjusted depending on the command (increase/decrease power) included in the message CNT.

Although it has been described that the traffic load in the radio cell is determined based on the measured SIR for the pilot signal, it is also possible to determine the traffic load in some other way. One possibility is that the base station is adapted to transmit a message to the mobile station where the number of ongoing calls is stated as a number.

Another possibility is that the mobile station keeps record of the transmission power used by the base station by increasing a reference value for the transmission power by a predetermined amount each time a "increase power" command is transmitted to the base station and correspondingly by decreasing the reference value each time the a "decrease power" command is transmitted. In this case, the mobile station must be aware of the initial transmission power used by the base station when the connection is established. The power control can in this case be based for instance on a comparison value calculated by the formula:

$$CV=(SIR_m/SIR_t)*(P_{tx}/P_t)^n,$$

wherein $SIR_m$ is the measured signal interference ratio, $SIR_t$ is a target value for the signal interference ratio, $P_{tx}$ is the powerlevel used by the base station, $P_t$ is a target value for the powerlevel, and n is a weight factor.

In still another embodiment, the power control of the base station can be accomplished so that the mobile station is adapted to measure the signal interference ratio for the signals received on the traffic channel and to transmit a message to the base station indicating the measured $SIR_m$. In this case, the control unit 39 as shown in FIG. 3 is replaced by a signalling unit. The signalling unit is then adapted to report the measured $SIR_m$ to a control unit (which is similar to the control unit 9 of FIG. 2) which is included in the base station BTS'. The control unit (located in the base station) is in this case adapted to adjust the transmission power used by the base station.

It should be understood that the above description and the figures associated therewith are only intended to illustrate the present invention. Different modifications and variations will be obvious for a person skilled in the are without deviating from the scope and the spirit of the invention set forth in the attached claims.

I claim:

1. A method for controlling transmission power of a radio transmitter in a radio cell in a cellular communications system, comprising the steps of:

determining a first reference value ($SIR_m$) indicating the quality of signals received from the radio transmitter;

determining a second reference value ($P_m$, $SIR_{pm}$) indicating current traffic load in the radio cell commanding the radio transmitter to adjust transmission power thereof; and comparing both said first reference value ($SIR_m$) indicating the quality of the received signals, and said second reference value ($P_m$, $SIR_{pm}$) indicating the traffic load, with predetermined target values ($SIR_t$, $P_t$, $SIR_{pt}$) to obtain a result;

said commanding includes commanding the radio transmitter to adjust the transmission power thereof depending on said result of said comparison;

said comparing of said first reference value ($SIR_m$) indicating the quality of the received signals, and said second reference value ($P_m$) indicating the traffic load with predetermined target values ($SIR_t$, $P_t$) comprises:

calculating a first comparison value based on a relationship between said first reference value ($SIR_m$) and a target value for said first reference value ($SIR_t$);

calculating a second comparison value based on a relationship between said second reference value ($P_m$) and a target value for said second reference value ($P_t$);

combining said first and second comparison values to obtain a weighted comparison value (CV) which depends more on said first comparison value than on said second comparison value; and comparing said weighted comparison value with a predetermined reference value to thereby determine if the transmission power of the radio transmitter should be increased or decreased.

2. The method according to claim 1, further comprising:

determining said reference value ($SIR_m$) indicating the quality of the signals received from the radio transmitter by measuring a signal interference ratio, a bit error rate or a frame error rate of signals received from the radio transmitter; and;

determining said reference value ($P_m$) indicating the current traffic load in the radio cell by measuring the power level of radio signals received from said radio transmitter or by receiving a reference value indicating the power level used by said radio transmitter.

3. The method as claimed in any one of claims 1–2, wherein said comparing comprises:

calculating a weighted comparison value from the formula:

$$CV=(SIR_m/SIR_t)*(P_m/P_t)^n,$$

wherein $SIR_m$ is the measured signal interference ratio, $SIR_t$ is a target value for the signal interference ratio, $P_m$ is the measured power level, $P_t$ is a target value for the power level, and n is a weight factor; and comparing the comparison value CV with a reference value K, whereby the radiotransmitter is commanded to increase the transmission power if CV<K, and to decrease the transmission power if CV>K.

4. The method as claimed in claim 3, wherein:

said reference value K=1 and said weight factor n<1.

5. A base station serving a radio cell of a cellular radio system comprising:

means for communicating with mobile radio stations by using radio frequency signals;

measurement means for measuring a first reference value for the quality of radio signals received from a said mobile radio station and means for determining a second reference value for traffic load in said radio cell;

control means for commanding said mobile radio station to increase or to decrease transmission power used by said mobile radio station for transmitting radio signals, by transmitting a message to said mobile radio station;

wherein said control means are adapted to:

calculate a first comparison value based on the relationship between said first reference value and a target value for said first reference value;

calculate a second comparison value based on the relationship between said second reference value and a target value for said second reference value;

combine said first and second comparison values to obtain a weighted comparison value which depends more on said first comparison value than on said second comparison value;

compare said weighted comparison value with a predetermined reference value; and command said mobile radio station to increase or to decrease transmission power in response to a result of said comparison.

6. The base station according to claim 5, wherein:

said base station is a base station of a spread spectrum communication system.

7. The base station according to claim 5 or 6, wherein:

said means for measuring is arranged to determine said first reference value indicating the quality of the signals received from the mobile radio station by measuring a signal interference ratio, a bit error rate or a frame error rate of signals received from said radio transmitter, and said means for determining is arranged to determine said second reference value indicating the current traffic load in the radio cell by measuring the power level of radio signals received from said mobile radio station.

8. A mobile station of a cellular radio system comprising:

means for communicating with a base station serving a radio cell, by using radio frequency signals;

measurement means for measuring a first reference value for the quality of radio signals received from said base station and means for determining a second reference value for traffic load in said radio cell; and control means which are adapted to:

calculate a first comparison value based on the relationship between said first reference value and a target value for said first reference value;

calculate a second comparison value based on the relationship between said second reference value and a target value for said second reference value;

combine said first and second comparison values to obtain a weighted comparison value which depends more on said first comparison value than on said second comparison value;

compare said weighted comparison value with a predetermined reference value; and command said base station to increase or to decrease transmission power as a response to a result of said comparison, by transmitting a message to said base station.

9. The mobile station according to claim 8, wherein:

said mobile station is a mobile station of a spread spectrum communication system; and said means for measuring is arranged to determine said reference value indicating the quality of the signals received from the base station by measuring a signal interference ratio, a bit error rate or a frame error rate of said radio signals received from said base station, and said means for determining is arranged to determine said reference value indicating current traffic load in by measuring the signal interference ratio of a pilot signal transmitted by said base station.

* * * * *